| United States Patent [19] | [11] Patent Number: 4,582,707 |
| Calabro | [45] Date of Patent: Apr. 15, 1986 |

[54] NON-STICKING CHEWING GUM

[75] Inventor: Frank P. Calabro, Fishkill, N.Y.

[73] Assignee: Nabisco Brands, Inc., Parsippany, N.J.

[21] Appl. No.: 686,187

[22] Filed: Dec. 26, 1984

[51] Int. Cl.$^4$ .............................................. A23G 3/30
[52] U.S. Cl. ........................................ 426/4; 426/658; 426/3
[58] Field of Search ................... 426/3, 4, 5, 6, 573, 426/548, 658

[56] References Cited

U.S. PATENT DOCUMENTS

| 2,290,120 | 7/1942 | Thomas | 99/135 |
|---|---|---|---|
| 3,982,009 | 9/1976 | Slangan et al. | 426/3 |
| 4,065,579 | 12/1977 | Mackay et al. | 426/3 |
| 4,156,740 | 5/1979 | Glass et al. | 426/3 |
| 4,238,510 | 12/1980 | Cherukuri et al. | 426/5 |
| 4,241,091 | 12/1980 | Stroz et al. | 426/4 |
| 4,250,196 | 2/1981 | Friello | 426/5 |
| 4,252,830 | 2/1981 | Kehoe et al. | 426/5 |
| 4,271,197 | 6/1981 | Hopkins | 426/3 |
| 4,382,962 | 5/1983 | Devos et al. | 426/3 |
| 4,405,647 | 9/1983 | Fisher et al. | 426/4 |
| 4,514,422 | 4/1985 | Yang | 426/3 |

Primary Examiner—Jeanette Hunter
Attorney, Agent, or Firm—Richard Kornutik

[57] ABSTRACT

The affinity of chewing gum made with hydrogenated starch hydrolysate, alone, or with glycerine, to become sticky is ameliorated by the addition of carboxymethyl cellulose.

7 Claims, No Drawings

NON-STICKING CHEWING GUM

BACKGROUND OF THE INVENTION

1. Field of the Invention

The present invention relates to chewing gum compositions which contain hydrogenated starch hydrolysate and, optionally, glycerine and which are further formulated with carboxy methyl cellulose to ameliorate the tendency of such formulations to otherwise stick to the machinery in which they are made and/or to the packaging materials in which they are packaged.

2. Description of the Prior Art

Present advances in the art of formulating chewing gum have dictated that such products be made with relatively large amounts of aqueous solutions of hydrogenated starch hydrolysate.

The hydrogenated starch hydrolysate has been found useful as a stabilizing agent for aspartame in various products such as chewing gum. See in this regard for example U.S. patent application Ser. No. 677,716 filed Dec. 4, 1984, in the names of D. R. Friello et al and entitled "Comestible Containing Moisture, $CaCO_3$ and Shelf Storage Stabilized L-Aspartic Acid Derivative; U.S. patent application Ser. No. 677,717 filed Dec. 4, 1984 in the names of D. R. Friello, et al. and entitled "Comestible Containing Moisture And Shelf Storage Stabilized L-Aspartic Acid Derivative." The disclosures of these patent applications are incorporated herein by reference.

When the products of these U.S. patent applications are made with the commercially available aqueous solutions of hydrogenated starch hydrolysate they tend to have relatively high moisture contents, of the order of about 5 to 8%.

Glycerine, which is a hygropscopic material, has also been proposed for use in relatively large amounts as a softening agent in chewing gum, see in this regard for example European Patent Application No. 82670 and International Patent Application WO No. 84-10693.

The Products made with the hydrogenated starch hydrolysate, alone, or with the glycerine, because of their relatively large moisture contents, and optionally, due to the hygroscopic nature of the glycerine, tend to sweat and to have a tendency to stick to the machinery in which they are made and to the wrapping materials in which they are packaged. The sticking of the chewing gum formulations to the machinery slows down the efficiency of the production process and the sticking of the final chewing gum products to the wrapping materials detracts from the aesthetics of the products in the eyes of the consuming public. The sweating phenomena is caused during the manufacturing process by the need for relatively high mixing temperatures of the order of 150° F. The sticking phenomena may also be caused by a slight sweating and/or dewing of the product during storage of the packaged products at relative humidity conditions of 35% RH at 25° C.

The term "sweating" as used herein means the migration of moisture from the interior of the mass of the formulation or product to the surface thereof. The term "dewing" as used herein means the absorbance of moisture, from the atmosphere, onto the surface of a product.

U.S. Pat. No. 2,273,425 discloses the use of ethyl cellulose to reduce tack in chewing gum. U.S. Pat. No. 4,241,091 discloses the use of various thickening agents, such as carboxymethyl cellulose, in chewing gum containing certain slip agents or texturizing agents.

EPA Pat. No. 109,771, published May 30, 1984, discloses the use of certain agglomerating agents for the purposes of agglomerating dry powdery mixtures containing dipeptide sweeteners such as aspartame to protect the shelf life, and to improve the solubility of the dipeptide. The agglomerating agents are aqueous solutions comprising colorant, organic acid and binding agent. The binding agent may be certain dextrins, corn syrup solids, high fructose corn syrup solids, modified starches and gums. The gums may be pectin, xanthan gum, gum arabic, or carboxymethyl cellulose. The agglomerating process produces an encapsulated form of the dipeptide sweetener which is thus protected against contact with moisture during the storage thereof in dry form.

Prior to the present invention, it has been difficult to provide chewing gum products made with aqueous hydrogenated starch hydrolysate, and, optionally, glycerine, and which do not present sticking problems during the manufacturing and storage stages in the commercialization of such products.

An object of the present invention, therefore, is to provide storage stable chewing gum formulations and products which contain aqueous hydrogenated starch hydrolysate and, optically, glycerin, and which have a greatly reduced tendency to sweat and to stick or adhere to the machinery in which they are made and/or to the packaging materials in which they are packaged.

SUMMARY OF THE PRESENT INVENTION

It has now been found, according to the present invention, that chewing gum products made with relatively large amounts of aqueous hydrogenated starch hydrolysate and, optionally, glycerin, and which do not sweat while exposed to the ambient atmosphere, can be provided by formulating the chewing gum product during the manufacture thereof with carboxymethyl cellulose.

DESCRIPTION OF THE PREFERRED EMBODIMENT

The term "sticky" or "stickiness" as used herein means the tendency of the chewing gum product to readily stick to itself or other objects, such as the machinery in which it is normally made and/or the packaging materials in which it is normally packaged.

The only hydrocolloid material found to be useful to prevent stickiness in the products of the present invention is carboxymethyl cellulose (CMC), or sodium cellulose glycolate, or carboxymethyl cellulose sodium. The CMC is used in the compositions of the present invention at a level of about 0.5 to 3.0, and preferably of about 1 to 2% by weight, based on the weight of the entire chewing gum formulation. The CMC may be added to the gum base portion of the formulation, or added dry to the flavorant portion of the formulation.

CHEWING GUM COMPOSITIONS

The chewing gum compositions contemplated by the present invention comprise all types of sugar and sugarless chewing gums and chewing gum formulations known to those skilled in the art, including the regular gum and the bubble gum types. Typical chewing gum compositions comprise a chewing gum base, a modifier, a bulking agent or sweetener and one or more other additives such as flavoring agents, colorants and antioxidants. The modifying agents are used to soften, plasticize and/or compatibilize one or more of the components of the gum base and/or of the formulation as a whole.

The chewing gum products of the present invention would have the following formulation:

| Component | Weight % of Component | |
|---|---|---|
| | Broad Range | Preferred Range |
| gum base | 15 to 35 | 20 to 30 |
| carboxymethyl cellulose+ | 0.5 to 3.0++ | 1.0 to 2.0++ |
| glycerin | 0 to 30 | 5 to 15 |
| filler | 2 to 35 | 10 to 30 |
| non-sugar sweetener | 0 to 2 | 0.1 to 0.4 |
| mannitol | to | to |
| natural sugar | 0 to 90 | 40 to 65 |
| coloring agent | 0.1 to 0.5 | 0.15 to 0.3 |
| flavoring agent (other than sweetener) | 0.5 to 2.5 | 0.18 to 1.2 |
| moisture* | 5 to 8 | 6 to 7 |
| hydrogenated starch hydrolysate | 5 to 30 | 10 to 25 |
| Total | 100 | 100 |

*Moisture content contributed by all components, including any H₂O added as such.
+May be added as part of gum base or as a separate component
++on a dry basis

GUM BASE

The composition of the gum base will vary depending on whether the gum base is to be used in a chewing gum product which is to be a regular, or non-bubble, gum product or a bubble gum product. For use in making a bubble gum or regular chewing gum product, the following gum base formulations may be used, in accordance with the present invention:

| | Weight % of Component in Gum Base For | | | |
|---|---|---|---|---|
| | Bubble Gum Product | | Regular Gum Product | |
| Component | Broad Range | Preferred Range | Broad Range | Preferred Range |
| masticatory material | 8–22 | 9–18 | 8–25 | 9–18 |
| plasticizer for masticatory material | 5–35 | 10–20 | 2–30 | 8–20 |
| hydrophilic detackifier | 0–30 | 4–10 | 5–35 | 10–25 |
| plasticizer for hydrophilic detackifier | 0–14 | 0–8 | 1–15 | 3–12 |
| wax | 3–15 | 5–10 | 4–20 | 8–15 |
| mineral filler | 1–35 | 10–22 | 5–35 | 15–30 |
| antioxidant | 0–0.1 | 0.5–0.9 | 0–0.1 | 0.03–0.09 |
| Total | | 100 | | 100 |

The masticatory substances are elastomeric materials which may be synthetic or natural in origin. The masticatory substances of synthetic origin would include styrene-butadiene copolymer, butyl rubber (which is isobutylene-isoprene copolymer) and polyisobutylene. The natural masticatory substances would include chicle, crown gum, nispero, balata, jelutong, pendare, perillo, niger gutta, tunu, leche caspi, sorva and gutta hank kang.

The plasticizer for the masticatory substance will preferably comprise a hydrogenated ester gum, that is, a glycerol ester of hydrogenated resin and/or dimerized ester gum. However, other resins may be employed such as pentaerythritol ester gum, polymerized ester gum, polyterpene resin and ester gum.

The hydrophilic-type detackifier is a material which will sorb saliva and would include vinyl polymers having a molecular weight of at least 2,000, and preferably of about 2,000 to 80,000 or more, such as polyvinyl acetate, polyvinyl butyl ether and copolymers of vinyl esters and/or vinyl ethers with ethylene.

The plasticizers for the hydrophilic type detackifiers would include one or more of triacetin, acetylated glycerides and other flavor adjuvants such as ethyl acetate and triethyl citrate, and others as listed in U.S. Pat. No. 4,452,820 at column 4, lines 27 to 46, the disclosure of which is incorporated herein by reference.

The oleaginous material includes waxes which are used primarily as compatibilizers/plasticizers between the elastomeric and resin phases, where such two phases are employed. Examples of the waxes are petroleum waxes such as paraffin wax and microcrystalline wax; the polyethylene waxes; and natural waxes derived from either plant or animal sources such as candelilla wax, carnuba wax and bees wax. The oleaginous material may also include hydrogenated vegetable or animal fats, cocoa butter or other softening-emulsifying agents such as phosphatides such as lecithin and di- and triglycerides of fatty acids.

The mineral fillers would include calcium carbonate, titanium dioxide, talc, alumina, tricalcium phosphate and mixtures thereof.

In addition, the gum base may include antioxidants such as butylated hydroxy toluene, butylated hydroxy anisole and propyl gallate.

The chewing gum compositions of the present invention can be sugar based or sugarless. The sugar or sugar substitute used in the compositions of this invention include natural sugars or non-nutritive sweeteners. The amount of natural sugar which can be present in the final composition can range from about 0.5 to about 90 weight percent. The amount of non-sugar sweetener which can be used can range from 0 to about 2 weight percent of the final composition.

The term "natural sugar" includes one or more sugar containing materials, for example, monosaccharides of 5 to 6 carbon atoms, such as arabinose, xylose or sorbose, or mixtures of two or more of the foregoing monosaccharides; disaccharides such as sucrose, for example, cane or beet sugar including sucrose and dextrose, lactose, maltose or cellobiose; and polysaccharides such as dextrin or corn syrup solids.

In addition, the dried higher polyhydricalcohols may be employed together with an artificial sweetener such as poorly water-soluble, as well as water-soluble, sweeteners such as aspartame or L-aspartyl-L-phenylalanine methyl ester, the free acid form of saccharin, sodium, calcium or ammonium saccharin salts, dihydrochalcones, glycyrrhizin, dipotassium, glycyrrhizin, glycyrrhizic acid/ammonium salt, talin, acesulfame K, as well as *Stevia rebaudiana* (Stevioside), *Richardella dulcifica* (Miracle Berry), *dioscoreophylim cumminisu* (Serendipity Berry), free cyclamic acid and cyclamate salts, and the like, or mixtures of any two or more of the above.

In addition to the above, the chewing gum made by this invention can also contain conventional FD&C and natural coloring agents.

The flavoring which can be included in the chewing gum compositions made in this invention can comprise one or more synthetic flavors and/or oils derived from plants, leaves flowers and fruit. Representative flavors and oils of these types include acids such as adipic, succinic and fumaric acid; citrus oils such as lemon oil, orange oil, lime oil and grapefruit oil; fruit essences, such as apple essence, pear essence, peach essence, strawberry essence, apricot essence, raspberry essence, cherry essence, plum essence and pineapple essence; essential oils such as peppermint oil, spearmint oil, mixtures of peppermint oil and spearmint oil, clove oil, bay oil, anise oil, oil of nutmeg, oil of sage, oil of bitter almonds, cassia oil and methylsalicylate (oil of wintergreen). Various synthetic flavors such as those for a mixed fruit, may also be incorporated in the chewing gum with or without conventional preservatives.

The hydrogenated starch hydrolysate which may be used in the compositions of the present invention may be a hydrogenated corn syrup or hydrogenated starch hydrolysates of varying dextrose equivalents (DE), such as are disclosed in U.S. Pat. Re. No. 26,959 and U.S. Pat. Nos. 3,556,811, 4,279,931 and 4,382,962, as well as various hydrogenated glucose syrups and/or reconstituted powders which contain sorbitol, hydrogenated disaccharides, tri- to hexa-hydrogenated saccharides, and hydrogenated higher polysaccharides, or mixtures of any two or more of the above.

The hydrogenated glucose syrups or hydrogenated starch hydrolysates and/or reconstituted powders thereof may be produced by catalytic hydrogenation of standard glucose syrups (acid and/or enzyme converted) to the point where all the glucose end groups of the saccharides are reduced to alcohols, that is, dextrose to sorbitol. In the case of hydrogenated glucose syrups, the total solids contents will usually range from about 65 to about 80%, which solids are made of from about 4 to about 70%, and preferably from about 4 to about 20%, sorbitol, from about 8 to about 65%, and preferably from about 20 to about 65%, hydrogenated disaccharides (that is, mannitol) and 20 to 80% of the higher (tri to hepta) hydrogenated saccharides. The preferred of the hydrogenated starch hydrolysates contain from about 8 to about 45%, and preferably about 15 to 45%, tri- to hepta-hydrogenated saccharides, and from about 10 to about 35%, and preferably about 15 to 25%, hydrogenated saccharides higher than hepta.

The hydrogenated starch hydrolysate is also referred to in the literature as hydrogenated glucose syrup, or by the trademark or tradename Lycasin polyol or Lonza polyol. The term hydrogenated starch hydrolysate will be used herein to designate such material. The hydrogenated starch hydrolysate is usually sold commercially in the form of an aqueous solution thereof having a moisture content of about 20 to 35%.

In one of the preferred embodiments of the present invention mannitol is used as a dusting agent. When used for such purpose it is used in the form of powder.

GENERAL PREPARATION OF CHEWING GUM PRODUCT

The chewing gum products of the present invention are prepared by first separately preparing the gum base. To then prepare either a sugar based or sugarless chewing gum formulation, the gum base for the product is melted at a temperature about 190° to 250° F., and the other components of the composition are added thereto. The resulting composition is uniformly admixed. This takes about 3 to 7 minutes for commercial sized batches of these formulations. Each of the components is usually separately added to the formulated composition and uniformly mixed in before the next component is added. All of the admixing operations are conducted at temperatures in the range of about 115° to 185° F., and preferably of about 125° to 180° F., for a total mixing time, at such temperatures, of about 10 to 20 minutes. These operations do not have to be conducted under anhydrous conditions in preparing the compositions of the present invention, and any amounts of moisture that are normally present in the raw materials that are used in the compositions of the present invention do not usually have to be removed therefrom either prior to, or during, the formulating process. The one exception to this concept of not removing water occurs when using rubber latices as the source of the masticatory substance. As in prior art practice, the moisture content of the latex is, essentially, normally removed after coagulating the latex.

The chewing gum formulations disclosed herein may thus be prepared, and processed into chewing gum products, using conventional chewing gum formulation mixing, processing and packaging equipment and concepts.

The following examples are merely illustrative of the present invention and are not intended as a limitation upon the scope thereof.

PREPARATION OF CHEWING GUM COMPOSITIONS

Various chewing gum compositions were prepared using various of the gum bases prepared as described above. In preparing the chewing gum compositions, they were prepared either in pilot plant sized batches in paddle mixers. In preparing each batch, the previously prepared gum base is melted at a temperature of up to about 245°±5° F. and is premixed with lecithin and color additive, and optionally, the hydrogenated starch hydrolysate, until the temperature drops to about 185° to 189° F. Then there is sequentially added powdered sorbitol (at a temperature of 180° F.), liquid flavor (i.e., peppermint), liquid sorbitol, if used, glycerin, if used, alone or with the hydrogenated starch hydrolysate if the latter is not premixed with the gum base, any additional flavorants, and finally the aspartame, and, optionally, any other intense sweeteners. Each component is paddle mixed in before the next is added. Each mixing step takes about 0.5 to 5.0 minutes and the total mixing time is about 10 to 15 minutes. The resulting product is recovered and further processed and packaged using conventional chewing gum making procedures.

The hydrogenated starch hydrolysate used in the chewing gum compositions evaluated in the Examples had a solids content of 75±1%, a monosaccharide content of about 6 to 8%, a disaccharide content of about 50 to 55%, and a higher saccharide content of about 38 to 48%. The higher saccharides were about 20 to 25% in the 3–7 DP (degree of polymerization) range, and about 18 to 23% in the 7 DP range.

Unless otherwise indicated, the $H_2O$ content* reported below for each of the chewing gum formulations of Examples 1 to 12 is a calculated amount based on the water content of the hydrogenated starch hydrolysate (HSH) and glycerine (where used) used in the respective formulations. The actual water content of these formulations is about 0.2 to 0.5% higher than the reported calculated values, since such additional amounts of water enter the final formulated product from the other components of the formulation and from the ambient atmosphere. The total of the reported weight percents for the respective formulations of these Examples will thus total about 100% plus the respectively reported calculated water contents.

The test formulations were prepared using batch pilot plant procedures. The step wise pilot plant procedure used for the product of Examples 1 to 12 was as follows:
p Prior to beginning the pilot plant batch making process, where glycerine is to be used in the formulation being employed, two separate glycerine/HSH batches are prepared, each of which contains one-half of each of the formulated amounts of the glycerine and the hydrogenated starch hydrolysate that are to be used in making the product of each example. One of such premixtures is then used in each of steps 4 and 7 noted below.

If glycerin is not used the HSH is added in two equal increments, as noted below, in each of steps 4 and 7.

STEP-WISE PILOT PLANT PROCEDURE

1. Into a pre-warmed sigma bladed mixer add molten gum base. The gum base temperature should be between 150°-200° F., and preferably between 170°-190° F.

2. With the blades of the mixer operating, and the temperature in the cited range, the lecithin is added and the mixing is continued for one minute.

3. Add ⅓ of the bulk sweetener (sucrose or sorbitol powder) and CMC and mix for two minutes, or until homogeneous.

4. Add one of the glycerine/HSH premixtures or the first ½ of the HSH and mix for two minutes, or until homogeneous.

5. Add ⅓ of the bulk sweetener and continue mixing for two minutes.

6. The liquid flavor is then added and mixing is continued for one minute.

7. Add the second glycerine/HSH premixture, or the second ½ of the HSH and mix for two minutes.

8. Add the remaining ⅓ of the bulk sweetener and the aspartame. Prior to production of the batch, the aspartame is premixed with approximately ⅓ of the bulk sweetener. Continue mixing for two minutes, or until the batch is homogeneous. The final gum temperature is approximately 112° F.

9. The gum is removed from the mixer and conditioned at 70° F./ambient R.H prior to forming.

10. The gum is rolled and scored into a stick configuration. Mannitol is applied to the surface of the scored gum to prevent surface adhesion. The gum is then transferred into fin-seal foil pouches and sealed.

EXAMPLES 1–3

Three sugar containing chewing gum products were made in the pilot plant procedure as described above, using the following formulations, in weight %:

| Component | Weight % of Component in Example | | |
|---|---|---|---|
|  | 1 | 2 | 3 |
| polyisobutylene elastomer based gum base | 24.00 | 24.00 | 24.00 |
| sucrose | 45.30 | 47.30 | 48.30 |
| hydrogenated starch hydrolysate | 26.00 | 26.00 | 26.00 |
| carboxymethyl cellulose | 3.00 | 1.00 | 0.00 |
| Flavor | 0.95 | 0.95 | 0.95 |
| Lecithin | 0.50 | 0.50 | 0.50 |
| Colorant | 0.25 | 0.25 | 0.25 |
| Total | 100.00 | 100.0 | 100.00 |

The product of Example 3 served as a control, it contained no CMC. Each product contained a calculated amount of 6.5% moisture, based on the 25% moisture content of the hydrogenated starch hydrolysate.

Each product was set out at room temperature enclosed in a polyethylene bag for about two weeks. In the case of the products prepared with both 1% and 3% CMC there was no sweating and the products were not sticky when handled.

In the case of the control product there was visual evidence of sweating and the product was sticky when handled.

Six additional sugar based chewing gum products were prepared using the formulation of Example 1, but wherein the carboxy methyl cellulose was replaced by 3 weight % of, respectively, pectin, locust bean gum, guar gum, alginate, ethyl cellulose and (Klucel) hydroxy propyl cellulose.

All of the products made with these other hydrocolloids, when held for two weeks at room temperature in a polyethylene bag, were sticky to the touch and gave visible evidence of sweating.

EXAMPLES 4–6

Three sugarless chewing gum products were made in the pilot plant procedure as described above, using the following formulations, in weight %:

| Component | Weight % of Component in Example | | |
|---|---|---|---|
|  | 4 | 5 | 6 |
| styrene-butadiene elastomer gum base | 29.0 | 29.0 | 29.0 |
| powdered sorbitol | 43.3 | 45.3 | 46.3 |
| hydrogenated starch hydrolysate | 23.0 | 23.0 | 23.0 |
| carboxymethyl cellulose | 3.0 | 1.0 | 0.0 |
| flavor | 1.2 | 1.2 | 1.2 |
| lecithin | 0.5 | 0.5 | 0.5 |
| Total | 100.00 | 100.00 | 100.00 |

The product of Example 6 served as a control, it contained no CMC. Each product contained a calculated amount of 5.75% moisture based on the 25% moisture content of the hydrogenated starch hydrolysate.

Each product was set out at room temperature enclosed in a polyethylene bag for about two weeks. In the case of the products prepared with both 1% and 3% CMC there was no sweating, and the products were not sticky when handled. In the case of the control product there was visual evidence of sweating and the product was sticky when handled.

Six additional sugarless based chewing gum products were prepared using the formulation of Example 4, but wherein the carboxymethyl cellulose was replaced by 3 weigh % of, respectively, pectin, locust bean gum, guar gum, ethyl cellulose, alginate and (Klucel) hydroxylpropyl cellulose.

All of the products made with these other hydrocolloids, when held for two weeks at room temperature in a polyethylene bag, were sticky to the touch and gave visible evidence of sweating.

EXAMPLE 7–9

Three sugar containing chewing gum products were made in the pilot plant procedure as described above using the following formulations, in weight %:

| Component | Weight % of Component In Example | | |
|---|---|---|---|
| | 7 | 8 | 9 |
| polyisobutylene elastomer based gum base | 24.00 | 24.00 | 24.00 |
| sucrose | 45.30 | 47.30 | 48.30 |
| hydrogenated starch hydrolysate | 21.00 | 21.00 | 21.00 |
| glycerine | 5.00 | 5.00 | 5.00 |
| cellulose gum | 3.00 | 1.00 | 0.00 |
| flavor | 0.95 | 0.95 | 0.95 |
| lecithin | 0.50 | 0.50 | 0.50 |
| colorant | 0.25 | 0.25 | 0.25 |
| Total | 100.00 | 100.00 | 100.00 |

The product of Example 9 served as a control, it contained no CMC. Each product contained a calculated amount of 5.35% moisture based on the moisture content of the hydrogenated starch hydrolysate (25%) and the glycerine (0.02%).

Each product was set out at room temperature enclosed in a polyethylene bag for about two weeks. In the case of the products prepared with both 1% and 3% CMC there was no sweating and the products were not sticky when handled. In the case of the control product there was visual evidence of sweating and the product was sticky when handled.

Six additional sugar based chewing gum products were prepared using the formulation of Example 7, but wherein the carboxymethyl cellulose was replaced by 3 weight % of, respectively, pectin, locust bean gum, guar gum, alginate, ethyl cellulose and (Klucel) hydroxypropyl cellulose.

All of the products made with these other hydrocolloids, when held for two weeks at room temperature in a polyethylene bag, were sticky to the touch and gave visible evidence of sweating.

EXAMPLES 10–12

Three sugarless chewing gum products were made in the pilot plant procedure as described above, using the following formulations, in weight %:

| Component | Weight % of Component In Example | | |
|---|---|---|---|
| | 10 | 11 | 12 |
| styrene butadiene elastomer based gum base | 29.0 | 29.0 | 29.0 |
| powdered sorbitol | 43.3 | 45.3 | 46.3 |
| hydrogenated starch hydrolysate | 15.0 | 15.0 | 15.0 |
| glycerine | 8.0 | 8.0 | 8.0 |
| carboxymethyl cellulose | 3.0 | 1.0 | 0.0 |
| lecithin | 0.5 | 0.5 | 0.5 |
| Total | 100.00 | 100.00 | 100.00 |

The product of Example 12 served as a control, it contained no CMC. Each product contained a calculated amount of 3.91% moisture, based on the moisture content of the hydrogenated starch hydrolysate (25%) and the glycerine (0.02%).

Each product was set out at room temperature enclosed in a polyethylene bag for about two weeks. In the case of the products prepared with both 1% and 3% CMC there was no sweating and the products were not sticky when handled.

In the case of the control product there was visual evidence of sweating and the product was sticky when handled.

Six additional sugarless chewing gum products were prepared using the formulation of Example 10, but wherein the carboxymethyl cellulose was replaced by 3 weight % of, respectively, pectin, locust bean gum, guar gum, alginate, ethyl cellulose and (Klucel) hydroxypropyl cellulose.

All of the products made with these other hydrocolloids, when held for two weeks at room temperature in a polyethylene bag, were sticky to the touch and give visible evidence of sweating.

What is claimed is:

1. Chewing gum comprising about 5 to about 30 weight % of aqueous hydrogenated starch hydrolysate, from 0 to about 30 weight % of glycerine and carboxymethyl cellulose in such amounts as to prevent said chewing gum from being sticky.

2. Chewing gum as in claim 1 comprising at least 15 weight % of hydrogenated starch hydrolysate.

3. Chewing gum as in claim 2 comprising at least 5% glycerin.

4. A non-sticky chewing gum product comprising about 5 to 30% hydrogenated starch hydrolysate, about 1 to 30% glycerin, about 5 to 8% moisture and about 0.5 and 3.0% carboxymethyl cellulose.

5. A non-sticky chewing gum product as in claim 4 comprising about 10 to 25% hydrogenated starch hydrolysate and about 5 to 15% glycerin.

6. In a process for manufacturing, packaging and storing packaged chewing gum products containing about 5 to 30% hydrogenated starch hydrolysate, about 0 to 30% glycerin and about 5 to 8% moisture so as to prevent said product from becoming sticky during the storage of the packaged product, the improvement which comprises formulating said product, during the manufacture thereof, with such amount of carboxymethyl cellulose as to prevent stickiness.

7. A process as in claim 6 in which said product comprises about 10 to 25% hydrogenated starch hydrolysate and about 5 to 15% glycerin.

* * * * *